United States Patent [19]

Goldman

[11] Patent Number: 5,753,295
[45] Date of Patent: May 19, 1998

[54] NON-DAIRY COMPOSITION CONTAINING FIBER AND METHOD FOR MAKING SAME

[76] Inventor: Marc S. Goldman, 200 Winston Dr., Apt. 1810, Cliffside Park, N.J. 07010

[21] Appl. No.: 696,071

[22] Filed: Aug. 31, 1996

Related U.S. Application Data

[63] Continuation-in-part of Ser. No. 418,149, Apr. 5, 1995, Pat. No. 5,558,897, which is a continuation-in-part of Ser. No. 223,042, Apr. 5, 1994, Pat. No. 5,447,741.

[51] Int. Cl.[6] .............................. A23L 2/00; A23L 1/308
[52] U.S. Cl. .............................. 426/590; 426/72; 426/74; 426/573; 426/618; 426/634; 426/804
[58] Field of Search ........................ 426/72, 804, 573, 426/634, 618, 74, 590

[56] References Cited

U.S. PATENT DOCUMENTS

| | | |
|---|---|---|
| 2,761,780 | 2/1956 | Stewart . |
| 3,025,164 | 7/1962 | Metzger . |
| 3,298,838 | 1/1967 | Villarreal . |
| 3,558,323 | 1/1971 | Cannalonga . |
| 3,901,978 | 8/1975 | Nelson et al. ............... 426/634 |
| 4,219,583 | 8/1980 | Igoe . |
| 4,232,054 | 11/1980 | Durlach . |
| 4,303,692 | 12/1981 | Gaull ............... 426/634 |
| 4,389,425 | 6/1983 | Burr, II . |
| 4,701,329 | 10/1987 | Nelson . |
| 4,797,289 | 1/1989 | Reddy . |
| 4,961,934 | 10/1990 | Iwasaki . |
| 5,066,500 | 11/1991 | Gil . |
| 5,114,729 | 5/1992 | D'Aprigny . |
| 5,229,136 | 7/1993 | Mark . |
| 5,234,704 | 8/1993 | Devine . |
| 5,260,279 | 11/1993 | Greenberg . |
| 5,389,387 | 2/1995 | Zuniga et al. ............... 426/599 |

FOREIGN PATENT DOCUMENTS

| | | |
|---|---|---|
| 175886 | 7/1987 | Japan . |

*Primary Examiner*—Helen Pratt
*Attorney, Agent, or Firm*—Cushman Darby & Cushman IP Group of Pillsbury Madison & Sutro, LLP

[57] ABSTRACT

The present invention relates to a non-dairy beverage composition containing non-dairy liquids such as soy milk or rice milk, and up to about 0.032 weight percent soluble dietary fiber prepared from guar gum which has been enzymatically hydrolyzed, and methods for making same. The composition may also contain non-fat solids and/or vitamins and minerals.

29 Claims, No Drawings

NON-DAIRY COMPOSITION CONTAINING FIBER AND METHOD FOR MAKING SAME

This is a continuation-in-part of application Serial No. 08/418,149 filed Apr. 5, 1995, now U.S. Pat. No. 5,558,897 which is a continuation-in-part application Ser. No. 08/223,042, U.S. Pat. No. 5,447,741, filed Apr. 5, 1994, and the entire contents of both documents are incorporated herein by reference.

FIELD OF THE INVENTION

The present invention relates to non-dairy beverages that contains fiber. More particularly, the present invention relates to a non-dairy composition made from soybeans and/or rice (commonly referred to as soy milk or rice milk) which contains fiber prepared from guar gum which has been enzymatically hydrolyzed, where the non-dairy composition has a low viscosity.

BACKGROUND OF THE INVENTION

Because of the dietary need for fiber, it would be advantageous if a non-dairy product existed that contained fiber, especially soybean and rice drinks. For instance, such non-dairy products are advantageous over dairy products because they are lactose-free, and therefore consumable by lactose-intolerant persons. Along these lines, non-dairy products are also advantageous because they are consumable by persons who suffer from other dairy-related allergies. Furthermore, unlike dairy products, non-dairy products are often cholesterol-free.

Heretofore, however, it was not feasible to produce a non-dairy drink product that contained fiber in any nutritionally beneficial amounts, without jeopardizing the consistency or taste of the product, or without having some or most of the fiber settle out. Whereas the daily dietary requirements of fiber for humans is high (for instance, the Food and Drug Administration guidelines specify that the recommended daily intake of fiber should be about 25 grams per adult), the amount of fiber that will stay in suspension with a non-dairy drink, such as a soybean drink or a rice drink, is conventionally quite low. Attempts to produce a non-dairy beverage containing a nutritional amount of dietary fiber resulted in most of the fiber precipitating out.

It would also be advantageous if a non-dairy product such as a soybean drink or a rice drink existed that contained nutritive amounts of both fiber and vitamins and minerals. However, vitamins and minerals often impart an undesirable taste or consistency to such drinks.

The present invention resolves these difficulties in that it provides a non-dairy liquid product that contains nutritionally beneficial amounts of fiber in solution with a non-dairy liquid. The invention also provides a non-dairy liquid product that contains nutritional amounts of both fiber and vitamins and minerals, without jeopardizing the integrity or taste of the non-dairy product.

SUMMARY OF THE INVENTION

It is an object of the present invention to provide a non-dairy beverage (soybean and rice beverages in particular) that contains dietary fiber in nutritional amounts, while retaining a low viscosity in the character of the beverage.

The present invention relates to a non-dairy dairy composition comprising a non-dairy liquid and soluble dietary fiber prepared from guar gum which has been enzymatically hydrolyzed. The amount of dietary fiber present in the non-dairy composition is high enough so as to provide significant nutritional benefits (for instance, up to about 25% RDA for adults), while retaining a relatively low viscosity (for instance, not greater than about 70 cp). The composition may include, for instance, non-dairy soybean milk and/or rice milk. Preferably, the fiber stays in solution with the composition and does not settle out.

In another embodiment, the present invention relates to a non-dairy composition comprising soluble dietary fiber, such as the composition described above, which further comprises non-dairy solids. For instance, such non-dairy solids can include soy solids, pea proteins, and calcium.

In a further embodiment, the present invention relates to a non-dairy composition comprising soluble dietary fiber, such as the composition described above, which further comprises vitamins and minerals. For instance, the composition may include vitamins such as vitamins A, $B_6$, $B_{12}$, C, D, E, niacin, folic acid, biotin, pantothenic acid, and may include minerals such as zinc.

The invention also contemplates a non-dairy composition comprising soluble dietary fiber, such as the composition described above, which further comprises both non-dairy solids and vitamins and minerals.

In addition, the present invention relates to a method of making a non-dairy composition having high amounts of dietary fiber (for instance, up to about 7 grams per 8 ounces or about 0.03 weight percent, which is about 25% RDA for adults), which method comprises the step of mixing together a non-dairy liquid (such as soy milk or rice milk) and soluble dietary fiber prepared from guar gum which has been enzymatically hydrolyzed.

The method may further comprise the step of adding non-dairy solids, and/or the step of adding vitamins and minerals. In addition, the method may further comprise the steps of pasteurizing or ultrapasteurizing.

DETAILED DESCRIPTION OF THE INVENTION

It has been found that adding certain soluble dietary fiber to non-dairy liquids such as soy milk or rice milk can provide a non-dairy beverage that significantly supplements nutritional dietary fiber intake, while retaining a relatively low viscosity of the finished non-dairy beverage product. Specifically, the finished product can contain up to about 0.03 weight percent dietary fiber which will provide up to about 25% RDA of dietary fiber. Preferably, the composition will have a viscosity not greater than about 70 cp, and preferably less than about 68 cp (most preferably, less than about 65 cp).

The fiber contemplated by the invention is prepared from guar gum which has been enzymatically hydrolyzed. In particular, the hydrolyzed guar gum is commercially available from Sandoz Nutrition Corp. (Minneapolis, Minn.) under the trade name BENEFIBER. It is also commercially available from Taiyo Kagaku Co., Ltd. (Japan) under the trade name SUNFIBER.

The guar gum is hydrolyzed by the enzyme β-mannase from *Aspergillus niger*. After hydrolysis, the guar gum may be refined by activated carbon, sterilized and spray-dried. Prior to hydrolysis, the molecular weight of guar gum is approximately 200,000. Following hydrolysis, the molecular weight is 20,000 to 30,000. However, for use in this invention the molecular weight may vary. Ideally, the amount of the fiber should not exceed about 0.03 weight percent of the total composition (or about 7 grams of fiber per 8 ounces of the non-dairy liquid product). The viscosity of the finished non-dairy product will preferably not exceed about 70 cp.

Preferably, the soluble dietary fiber remains in solution with the composition, and does not settle out. Amounts of the dietary fiber as high as about 0.03 weight percent (or about 7 grams of fiber per 8 ounces of non-dairy composition) can remain in solution in the composition, without jeopardizing the taste of the resulting product (i.e., without resulting in grittiness or an unpleasant texture). If the composition contains amounts of the dietary fiber higher than about 7.5 weight percent, some settling may occur.

The term "non-dairy" as contemplated by the invention is intended to include all types of products that contain no milk or milk products that come from cows, goats or other mammals, and includes at least all non-dairy beverages and other such edible liquids such as for instance, soybean milk, rice milk, and the like. Although the term "milk" may be used in connection with some of the components of the non-dairy composition of the invention (i.e., soy milk or rice milk), it is understood that this term embraces only non-dairy liquids or extracts.

Optionally, the non-dairy composition may further comprise natural or artificial flavoring. Examples of flavoring include chocolate, strawberry, vanilla, coffee, banana or peanut butter flavoring.

In another embodiment of the invention, the non-dairy composition may further comprise non-fat solids. It is advantageous to fortify the composition with non-fat solids to improve the taste and texture of the finished product. The term "non-fat solids" in connection with this invention is well known in the art, and denotes a combination of protein, carbohydrates, minerals and vitamins, such as would be obtained from soy protein, pea protein, calcium and the like.

In a further embodiment, the non-dairy composition may further comprise at least one vitamin and at least one mineral. Preferably, the vitamins include vitamins A, $B_6$, $B_{12}$, C, D, E, niacin, folic acid, biotin and/or pantothenic acid. Preferably, the mineral includes zinc. For example, a preferable embodiment would be where vitamin A comprises about 0.0909% weight percent of the non-dairy composition, vitamin $B_6$ comprises about 0.0069% weight percent of the non-dairy composition, vitamin $B_{12}$ comprises about 0.0164% weight percent of the non-dairy composition, vitamin C comprises about 0.3055% weight percent of the non-dairy composition, vitamin D comprises about 0.0114% weight percent of the non-dairy composition, vitamin E comprises about 0.1637% weight percent of the non-dairy composition, niacin comprises 0.05% weight percent of the non-dairy composition, folic acid comprises about 0.0011% weight percent of the non-dairy composition, biotin comprises about 0.075% weight percent of the non-dairy composition, pantothenic acid comprises about 0.0297% weight percent of the non-dairy composition, and zinc comprises about 0.0447% weight percent of the non-dairy composition.

In another embodiment, the non-dairy composition further comprises both the non-fat solids, as discussed hereinabove, and at least one vitamin and at least one mineral, as discussed hereinabove.

In a further embodiment, the present invention relates to a method of making a non-dairy composition having amounts of the dietary fiber as high as about 7.5 grams per 8 ounces, and preferably about 7 grams per 8 ounces (or about 0.03 weight percent). The method comprises the step of mixing together a non-dairy liquid, such as soy milk or rice milk, and soluble dietary fiber prepared from guar gum which has been enzymatically hydrolyzed.

As discussed hereinabove, it is preferable that the soluble dietary fiber remains in solution with the non-dairy liquid. For instance, amounts of the dietary fiber as high as about 0.032 weight percent can remain in solution in the non-dairy composition, without settling. Amounts of the dietary fiber as high as about 0.03 weight percent can remain in solution in the non-dairy composition, without jeopardizing the taste or consistency of the final product.

Optionally, the method may further comprise the step (or steps) of homogenizing, pasteurizing and/or ultrapasteurizing the non-dairy composition, either before the soluble dietary fiber is added or after.

Further, the method may further comprise the step of adding flavoring, either before the soluble dietary fiber is added or after. Examples of flavoring include chocolate, strawberry, vanilla, coffee, banana or peanut butter flavoring.

Additionally, the method may further comprise the step of adding non-fat solids, either before the soluble dietary fiber is added or after.

Further, the method may further comprise the step of adding at least one vitamin and at least one mineral, either before the soluble dietary fiber is added or after. Preferably, the vitamins include vitamins A, $B_6$, $B_{12}$, C, D, E, niacin, folic acid, biotin and/or pantothenic acid. Preferably, the mineral includes zinc. For example, a preferable embodiment would be where vitamin A comprises about 0.0909% weight percent of the non-dairy composition, vitamin $B_6$ comprises about 0.0069% weight percent of the non-dairy composition, vitamin $B_{12}$ comprises about 0.0164% weight percent of the non-dairy composition, vitamin C comprises about 0.3055% weight percent of the non-dairy composition, vitamin D comprises about 0.0114% weight percent of the non-dairy composition, vitamin E comprises about 0.1637% weight percent of the non-dairy composition, niacin comprises 0.05% weight percent of the non-dairy composition, folic acid comprises about 0.0011% weight percent of the non-dairy composition, biotin comprises about 0.075% weight percent of the non-dairy composition, pantothenic acid comprises about 0.0297% weight percent of the non-dairy composition, and zinc comprises about 0.0447% weight percent of the non-dairy composition.

In another embodiment, the present invention relates to a method of making the above-described non-dairy compositions, which method comprises the steps of:

(i) mixing together a non-dairy liquid and at least one vitamin and at least one mineral;

(ii) mixing non-fat solids with the result of step (i);

(iii) mixing up to about 0.03 weight percent soluble dietary fiber with the result of step (ii), which fiber is prepared from guar gum which has been enzymatically hydrolyzed, to form a non-dairy composition.

The specific order of mixing the components of steps (i), (ii) and (iii) (i.e., the fiber, vitamins and minerals, and non-fat solids) into the non-dairy liquid is not critical to practicing the invention. For instance, the non-fat solids may first be mixed with the non-dairy liquid, then the soluble dietary fiber may be added, and lastly the at least one vitamin and at least one mineral may be added.

It is preferable that the at least one vitamin, the at least one mineral, the non-fat solids and the soluble dietary fiber remain in solution with the non-dairy liquid.

The invention is further described in the following non-limiting examples, which are set forth for illustrative purposes only.

EXAMPLE 1

Soy Beverage

Dietary fiber prepared from guar gum which has been enzymatically hydrolyzed (called BENEFIBER) was obtained from Sandoz Nutrition. The fiber was thoroughly mixed into non-dairy soy milk made from soybeans until the fiber went into solution with the soy milk. (The procedures for making soy milk are well known in the art.) The soy milk solution was sweetened with brown rice syrup. All components were mixed at room temperature. To ultrapasteurize, the product was heated to about 300° F. for about 2 seconds.

Various amounts of fiber were tested, and it was determined that the highest level of dietary fiber that could be added to the soy milk without jeopardizing the integrity of the final soy beverage product was the equivalent of 7 grams of fiber per 8 ounces (240 ml), or about 0.03 weight percent, of total formula. As determined by experiments, this combination gave the best texture and smoothest mouth feeling, without settling at the bottom or leaving any aftertaste, as well as having a nice color. Also, it provided about 25% of the recommended daily intake (RDI) per 8 ounce serving (according to FDA guidelines).

In blind taste tests, no one could tell the difference from the control sample and the sample that was fortified with the fiber.

EXAMPLE 2

Rice Beverage

Dietary fiber prepared from guar gum which has been enzymatically hydrolyzed (called BENEFIBER) was obtained from Sandoz Nutrition.

The fiber was thoroughly mixed into non-dairy rice milk made from rice until the fiber went into solution with the rice milk. (The procedures for making rice milk are well known in the art.) The rice milk solution was sweetened with brown rice syrup, and fortified with protein, calcium, vitamins A and D, and riboflavin. All components were mixed at room temperature. To ultrapasteurize, the product was heated to about 300° F. for about 2 seconds.

Various amounts of fiber were tested, and it was determined that the highest level of dietary fiber that could be added to the rice milk without jeopardizing the integrity of the final rice beverage product was the equivalent of 7 grams of fiber per 8 ounces (240 ml), or about 0.03 weight percent, of total formula. As determined by experiments, this combination gave the best texture and smoothest mouth feeling, without settling at the bottom or leaving any aftertaste, as well as having a nice color. Also, it provided about 25% of the recommended daily intake (RDI) per 8 ounce serving (according to FDA guidelines). In blind taste tests, no one could tell the difference from the control sample and the sample that was fortified with fiber.

What I claim is:

1. A non-dairy composition comprising non-dairy liquid selected from the group consisting of soy milk and rice milk and up to about 0.032 weight percent soluble dietary fiber prepared from guar gum which has been enzymatically hydrolyzed.

2. The non-dairy composition according to claim 1, wherein the viscosity is not more than about 70 cp.

3. The non-dairy composition according to claim 1 which contains up to about 0.03 weight percent soluble dietary fiber.

4. The non-dairy composition according to claim 3, wherein the soluble dietary fiber remains in solution with the non-dairy liquid.

5. The non-dairy composition according to claim 1, which further comprises flavoring.

6. The non-dairy composition according to claim 5, wherein the flavoring includes rice syrup, chocolate, strawberry, vanilla, coffee, banana or peanut butter flavoring.

7. The non-dairy composition according to claim 1, which further comprises non-fat non-dairy solids.

8. The non-dairy composition according to claim 7, wherein the non-fat non-dairy solids are selected from the group consisting of soy solids, pea protein and calcium.

9. The non-dairy composition according to claim 1, which further comprises at least one vitamin and at least one mineral.

10. The non-dairy composition according to claim 9, wherein the vitamins are vitamins A, $B_6$, $B_{12}$, C, D, E, niacin, folic acid, biotin, riboflavin and pantothenic acid, and the mineral is zinc.

11. The non-dairy composition according to claim 9, which further comprises non-fat solids.

12. The non-dairy composition according to claim 11, wherein the non-fat solids are selected from the group consisting of soy solids, pea protein and calcium.

13. A method of making a non-dairy composition, which comprises the step of mixing together non-dairy liquid selected from the group consisting of soy milk and rice milk and up to about 0.032 weight percent soluble dietary fiber prepared from guar gum which has been enzymatically hydrolyzed.

14. The method according to claim 13, wherein the viscosity is not more than about 70 cp.

15. The method according to claim 13, wherein the composition contains up to about 0.03 weight percent soluble dietary fiber.

16. The method according to claim 15, wherein the soluble dietary fiber remains in solution with the non-dairy liquid.

17. The method according to claim 13, which further comprises the step of pasteurizing.

18. The method according to claim 13, which further comprises the step of ultra-pasteurizing.

19. The method according to claim 13 which further comprises the step of adding flavoring.

20. The method according to claim 19, wherein the flavoring includes rice syrup, chocolate, strawberry, vanilla, coffee, banana or peanut butter flavoring.

21. The method according to claim 13, which further comprises the step of adding non-fat solids.

22. The method according to claim 21, wherein the non-fat solids are selected from the group consisting of soy solids, pea protein and calcium.

23. The method according to claim 13, which further comprises the step of adding at least one vitamin and at least one mineral.

24. The method according to claim 23, wherein the vitamin is vitamins A, $B_6$, $B_{12}$, C, D, E, niacin, folic acid, biotin, riboflavin and pantothenic acid, and the mineral is zinc.

25. A method of making a non-dairy composition which comprises the steps of:

(i) mixing together non-dairy liquid selected from the group consisting of soy milk and rice milk and at least one vitamin and at least one mineral;

(ii) mixing non-fat solids with the result of step (i);

(iii) mixing up to about 0.032 weight percent soluble dietary fiber with the result of step (ii), which fiber is prepared from guar gum which has been enzymatically hydrolyzed, to form a non-dairy composition.

26. The method according to claim 25, wherein the viscosity of the non-dairy composition is not more than 70 cp.

27. The method according to claim 25, wherein in step (iii) up to about 0.03 weight percent soluble dietary fiber with the result of step (ii).

28. The method according to claim 27, wherein the at least one vitamin, the at least one mineral, the non-fat solids and the soluble dietary fiber remain in solution with the non-dairy liquid.

29. The method according to claim 25, which further comprises the step of pasteurizing the non-dairy composition.

* * * * *